(12) United States Patent
Tolstoy (10) Patent No.: US 11,483,286 B2
(45) Date of Patent: Oct. 25, 2022

(54) SYSTEM AND METHOD FOR IDENTIFYING NETWORK ADDRESSES ASSIGNED TO COMPUTING DEVICES

(71) Applicant: EMC IP Holding Company, LLC, Hopkinton, MA (US)

(72) Inventor: Vasiliy Tolstoy, St. Petersburg (RU)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 16/831,281

(22) Filed: Mar. 26, 2020

(65) Prior Publication Data

US 2021/0036992 A1 Feb. 4, 2021

(51) Int. Cl.
*H04L 9/40* (2022.01)
*H04L 67/02* (2022.01)
*H04L 41/22* (2022.01)

(52) U.S. Cl.
CPC .......... *H04L 63/0236* (2013.01); *H04L 41/22* (2013.01); *H04L 63/0876* (2013.01); *H04L 63/20* (2013.01); *H04L 67/02* (2013.01)

(58) Field of Classification Search
CPC . H04L 63/0236; H04L 63/0876; H04L 63/20; H04L 67/02; H04L 41/0253; H04L 41/12
See application file for complete search history.

(56) References Cited

U.S. PATENT DOCUMENTS

| 9,485,145 | B1 * | 11/2016 | Bonczkowski | G06F 21/577 |
| 2007/0237141 | A1 * | 10/2007 | Marchese | H04L 41/0853 370/389 |
| 2009/0094365 | A1 * | 4/2009 | Orady | G06F 15/173 709/226 |
| 2014/0189435 | A1 * | 7/2014 | Manuel-Devadoss | G06F 11/3495 714/43 |
| 2021/0003996 | A1 * | 1/2021 | Nagabhairava | G05B 19/4183 |

OTHER PUBLICATIONS

Sun, Yuan and E. Belding-Royer. "Dynamic Address Configuration in Mobile Ad hoc Networks." (Year: 2003).*

* cited by examiner

*Primary Examiner* — John M Macilwinen
(74) *Attorney, Agent, or Firm* — Brian J. Colandreo; Mark H. Whittenberger; Holland & Knight LLP (57) ABSTRACT

A method, computer program product, and computing system for providing, via a first computing device connected to a network, one or more network requests to a second computing device connected to the network, wherein each of the one or more network requests include an IP address and a predefined identification indicator. Identification information associated with the second computing device may be received from the second computing device in response to at least one network request of the one or more network requests including an IP address assigned to the second computing device. The IP address assigned to the second computing device may be paired, via the first computing device, with the identification information associated with the second.

17 Claims, 5 Drawing Sheets

SYSTEM AND METHOD FOR IDENTIFYING NETWORK ADDRESSES ASSIGNED TO COMPUTING DEVICES

CROSS-REFERENCE TO RELATED APPLICATIONS

The subject application claims priority to Russian Patent Application No. 2019124427, filed on Aug. 1, 2019. The entire disclosure of which is herein incorporated by reference.

BACKGROUND

Storing and safeguarding electronic content may be beneficial in modern business and elsewhere. Accordingly, various computing devices may be added to and/or removed from a storage system.

However, these changes to the storage system configuration may include the assignment of and/or re-assignment of network addresses to computing devices that are unknown to a user tasked with configuring the computing devices added to the storage system.

SUMMARY OF DISCLOSURE

In one example implementation, a computer-implemented method executed on a computing device may include but is not limited to providing, via a first computing device connected to a network, one or more network requests to a second computing device connected to the network, wherein each of the one or more network requests include an IP address and a predefined identification indicator. Identification information associated with the second computing device may be received from the second computing device in response to at least one network request of the one or more network requests including an IP address assigned to the second computing device. The IP address assigned to the second computing device may be paired, via the first computing device, with the identification information associated with the second computing device.

One or more of the following example features may be included. The IP address may be assigned to the second computing device. The IP address assigned to the second computing device may be unknown to the first computing device when the IP address is assigned to the second computing device. The one or more network requests may include one or more HTTP requests. Receiving, from the second computing device, the identification information associated with the second computing device may include publishing the identification information associated with the second computing device on a web browser displayed at the first computing device. Providing the one or more network requests may include providing a plurality of network requests iterating through a plurality of IP addresses. The predefined identification indicator may be specific to one or more computing device vendors.

In another example implementation, a computer program product resides on a computer readable medium that has a plurality of instructions stored on it. When executed by a processor, the instructions cause the processor to perform operations that may include but are not limited to providing, via a first computing device connected to a network, one or more network requests to a second computing device connected to the network, wherein each of the one or more network requests include an IP address and a predefined identification indicator. Identification information associated with the second computing device may be received from the second computing device in response to at least one network request of the one or more network requests including an IP address assigned to the second computing device. The IP address assigned to the second computing device may be paired, via the first computing device, with the identification information associated with the second computing device.

One or more of the following example features may be included. The IP address may be assigned to the second computing device. The IP address assigned to the second computing device may be unknown to the first computing device when the IP address is assigned to the second computing device. The one or more network requests may include one or more HTTP requests. Receiving, from the second computing device, the identification information associated with the second computing device may include publishing the identification information associated with the second computing device on a web browser displayed at the first computing device. Providing the one or more network requests may include providing a plurality of network requests iterating through a plurality of IP addresses. The predefined identification indicator may be specific to one or more computing device vendors.

In another example implementation, a computing system includes at least one processor and at least one memory architecture coupled with the at least one processor, wherein the computing system is configured to perform operations that may include but are not limited to providing, via a first computing device connected to a network, one or more network requests to a second computing device connected to the network, wherein each of the one or more network requests include an IP address and a predefined identification indicator. Identification information associated with the second computing device may be received from the second computing device in response to at least one network request of the one or more network requests including an IP address assigned to the second computing device. The IP address assigned to the second computing device may be paired, via the first computing device, with the identification information associated with the second computing device.

One or more of the following example features may be included. The IP address may be assigned to the second computing device. The IP address assigned to the second computing device may be unknown to the first computing device when the IP address is assigned to the second computing device. The one or more network requests may include one or more HTTP requests. Receiving, from the second computing device, the identification information associated with the second computing device may include publishing the identification information associated with the second computing device on a web browser displayed at the first computing device. Providing the one or more network requests may include providing a plurality of network requests iterating through a plurality of IP addresses. The predefined identification indicator may be specific to one or more computing device vendors.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
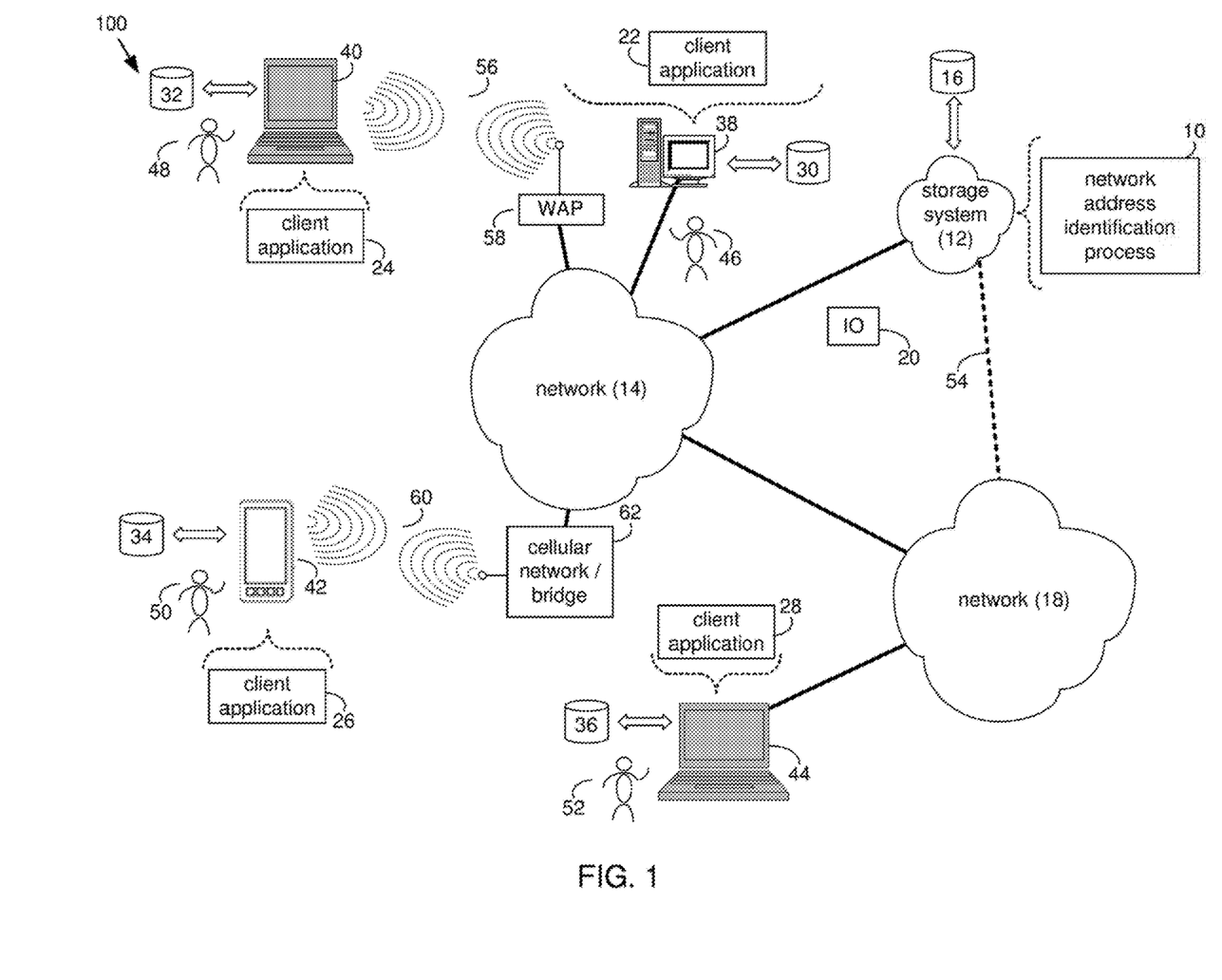
FIG. 1 is an example diagrammatic view of a storage system and a network address identification process coupled to a distributed computing network according to one or more example implementations of the disclosure.

System Overview:

Referring to FIG. 1, there is shown network address identification process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of network address identification process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of network address identification process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as network address identification process 10 of FIG. 1, may include but is not limited to, providing, via a first computing device connected to a network, one or more network requests to a second computing device connected to the network, wherein each of the one or more network requests include an IP address and a predefined identification indicator. Identification information associated with the second computing device may be received from the second computing device in response to at least one network request of the one or more network requests including an IP address assigned to the second computing device. The IP address assigned to the second computing device may be paired, via the first computing device, with the identification information associated with the second computing device.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
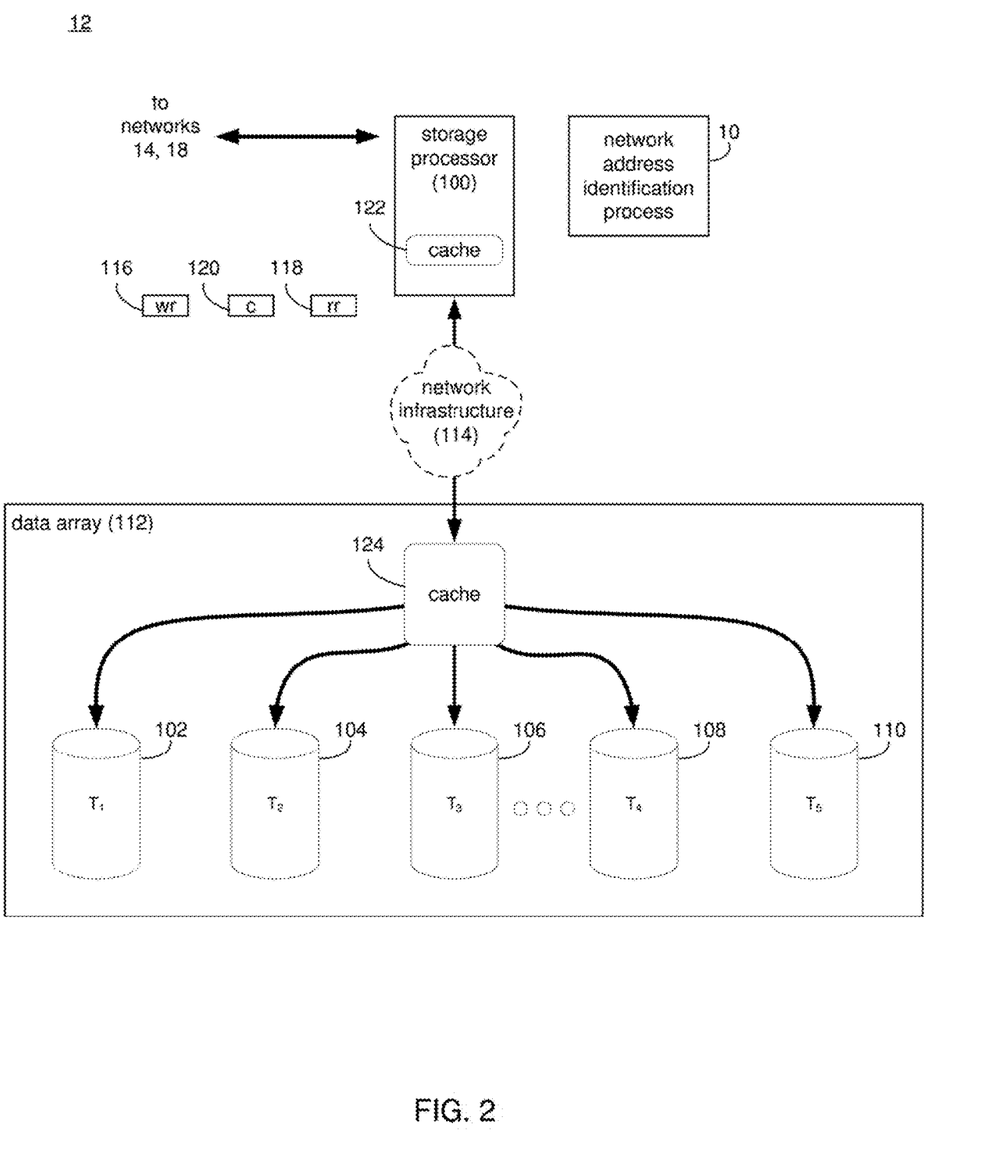
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of network address identification process 10. The instruction sets and subroutines of network address identification process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of network address identification process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of network address identification process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of network address identification process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
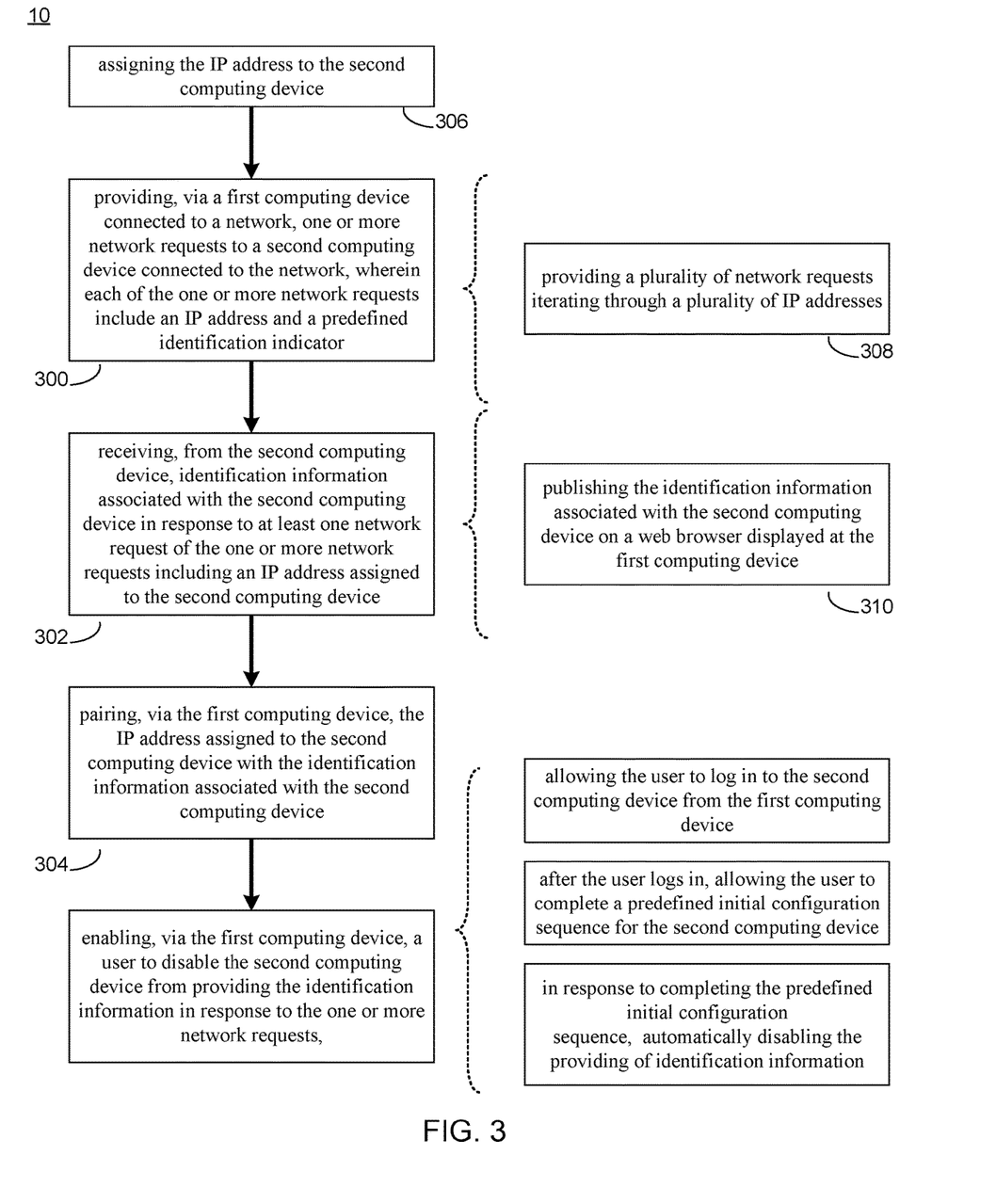
FIG. 3 is an example flowchart of the network address identification process of FIG. 1 according to one or more example implementations of the disclosure.
Figure 4:
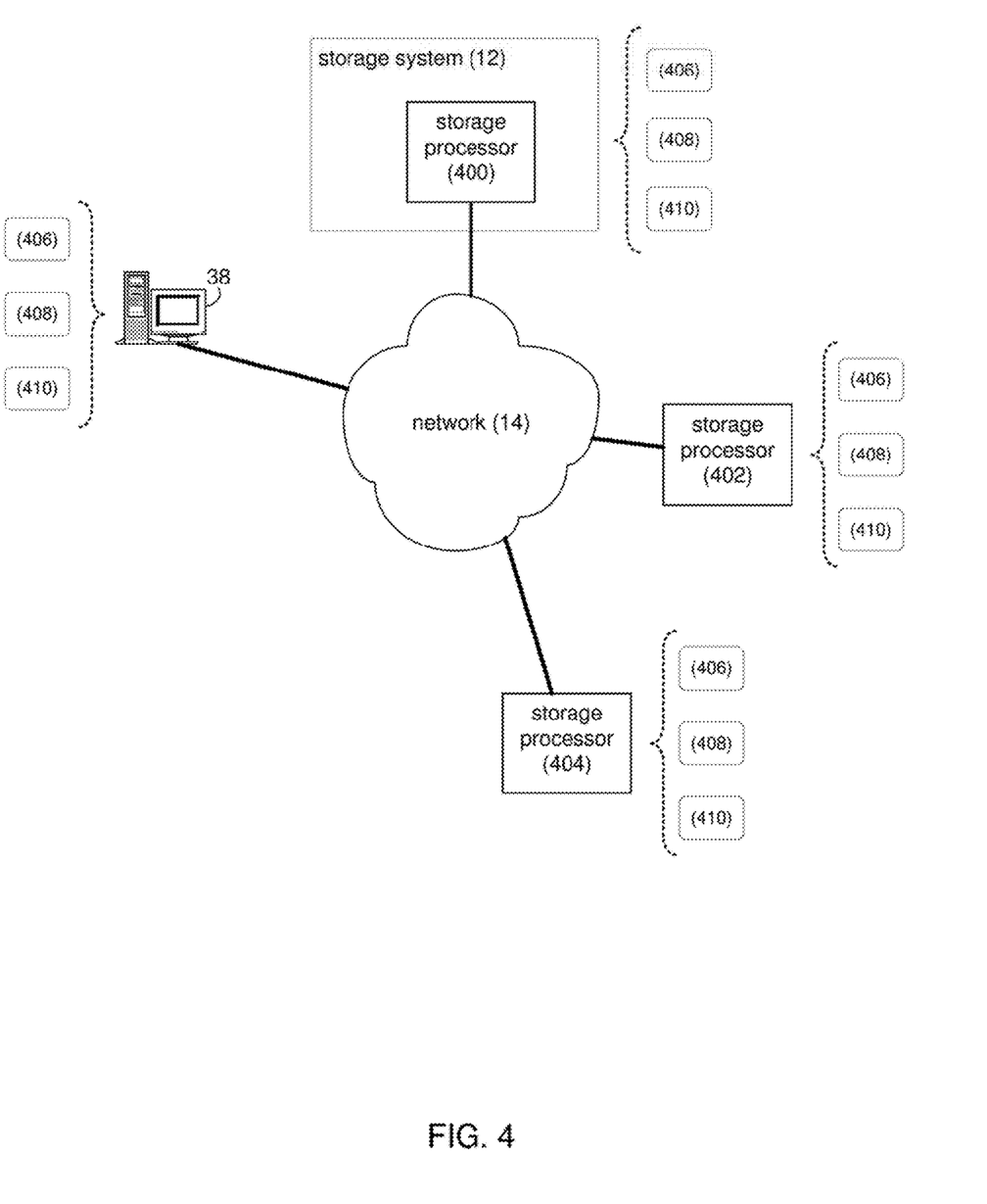
FIGS. 4-5 are example diagrammatic views of the network address identification process of FIG. 1 according to one or more example implementations of the disclosure.
Figure 5:
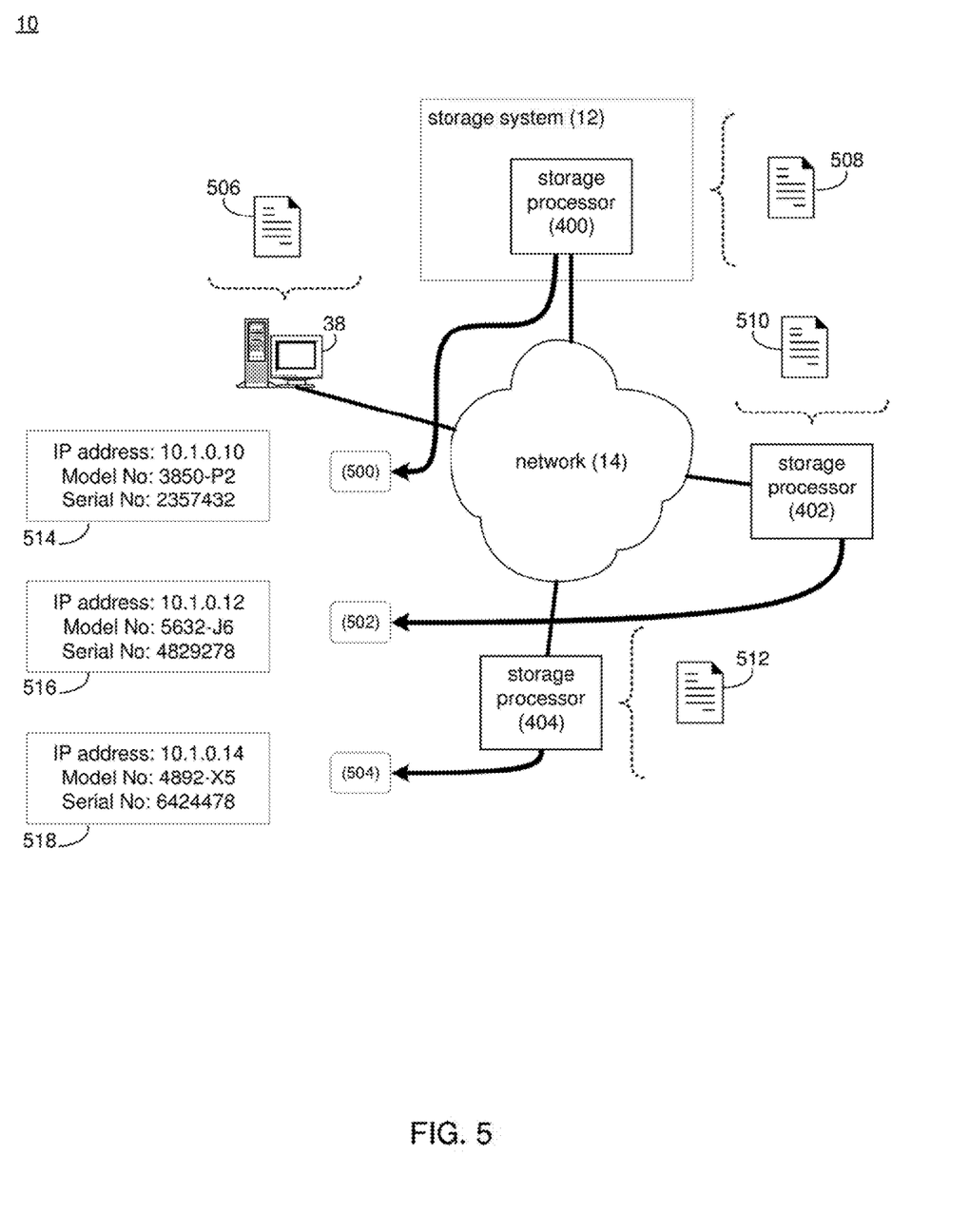

The Network Address Identification Process:

Referring also to FIGS. 3-5 and in some embodiments, network address identification process 10 may provide 300, via a first computing device connected to a network, one or more network requests to a second computing device connected to the network, wherein each of the one or more network requests include an IP address and a predefined identification indicator. Identification information associated with the second computing device may be received 302 from the second computing device in response to at least one network request of the one or more network requests including an IP address assigned to the second computing device. The IP address assigned to the second computing device may be paired 304, via the first computing device, with the identification information associated with the second computing device.

As will be discussed in greater detail below, embodiments of the present disclosure may provide an efficient, user-friendly way to identify which network address is assigned to a particular computing device. For example, when a computing device is connected to a network, a network address (e.g., an IP address) may be assigned. However, a system administrator may not be able to determine which computing device was assigned with which network address. Conventional approaches may generally include either setting up a special dynamic Domain Name System (DNS) server or obtaining access to an auto-configuration system internal status. Additionally, conventional approaches require connecting another computing device to the same layer 2 network or broadcast domain as the added computing device to determine a network address.

As is known in the art, in the seven-layer OSI model of computer networking, the data link layer is known as layer 2. In the TCP/IP reference model, layer 2 generally corresponds to (or is part of) the link layer. The data link layer is the protocol layer that transfers data between adjacent network nodes in a wide area network or between nodes on the same local area network segment. The data link layer provides the functional and procedural means to transfer data between network entities and may provide the means to detect and possibly correct errors that may occur in the physical layer. Examples of data link protocols are Ethernet for local area networks, the Point-to-Point Protocol (PPP), High-level Data Link Control (HDLC) and Advanced Data Communication Control Procedures (ADCCP) for point-to-point (dual-node) connections. The data link layer is concerned with local delivery of data frames between devices on the same LAN. Data frames generally do not cross the boundaries of a local network. Inter-network routing and global addressing (e.g., IP addressing) are higher layer functions (e.g., layer 3), allowing data-link protocols to focus on local delivery, addressing, and media arbitration.

Embodiments of the network address identification process of the present disclosure may allow a user to identify an network address (e.g., an IP address) without requiring connecting another computing device to the same layer 2 network or broadcast domain as the added computing device and without having to establish a special dynamic DNS server. Rather, and as will be discussed in greater detail below, one or more network requests may be provided from a first computing device to identify a network address assigned to a second computing device.

Referring also to the example of FIG. 4 and in some embodiments, various computing devices (e.g., computing device 38 and storage processors 400, 402, 404) may be connected to a network (e.g., network 14). In some embodiments, network 14 may be a layer 3 network. As will be discussed in greater detail below, computing devices (e.g., storage processors 400, 402, 404) may be installed into a storage system (e.g., storage system 12) and connected to a network. However, some computing devices (e.g., storage processors 400, 402, 404) may lack input devices for configuring the computing device (e.g., a keyboard, a mouse, a touchscreen, etc.) and may be configured by another computing device (e.g., computing device 38) connected to the same network (e.g., network 14). While an example of three storage processors and one computing device has been provided, it will be appreciated that any number and type of computing devices may be used within the scope of the present disclosure.

In some embodiments, network address identification process 10 may assign 306 an IP address to a computing device. In some embodiments, network address identification process 10 may allow manual assignment 306 of an IP address to a computing device (e.g., before the computing device is connected to the network, in response to connecting the computing device to the network, etc.). It will appreciated that an IP address may be assigned 306 to the computing device at any time before or after the computing device is connected to the network. For example, a user may manually assign 306 an IP address to the computing device (e.g., manually entering the IP address using one or more controls on the front panel of the computing device, inserting a storage device with an IP address (e.g., USB stick), etc.). It will be appreciated that the IP address may be manually assigned 306 in various ways within the scope of the present disclosure.

In some embodiments, network address identification process 10 may automatically assign 306 an IP to a computing device in response to connecting the computing device to the network. For example, when a computing device connects to a network, the computing device may be automatically assigned 306 an IP address using one or more protocols. In some embodiments, network address identification process 10 may automatically assign 306 an IP address using Dynamic Host Configuration Protocol (DHCP). As known in the art, DHCP may generally provide a framework for passing configuration information (IP address and the path of a configuration file) to hosts on a TCP/IP network. In some embodiments, network address identification process 10 may automatically assign 306 an IP address using stateless address autoconfiguration (SLAAC). As known in the art, SLAAC may generally include IPv6 hosts configuring themselves automatically when connected to an IPv6 network using the Neighbor Discovery Protocol via Internet Control Message Protocol version 6 (ICMPv6) router discovery messages. For example, when first connected to a network, a host may send a link-local router solicitation multicast request for its configuration parameters; routers respond to such a request with a router advertisement packet that contains Internet Layer configuration parameters. While two examples of protocols used to assign 306 an IP address to a computing device have been provided, it will be appreciated that IP addresses may be automatically assigned using various protocols within the scope of the present disclosure.

Referring again to the example of FIG. 4, suppose that storage processor 400 is connected to network 14. In this example, network address identification process 10 may assign 306 an IP address (e.g., 10.1.0.10) to storage processor 400. Continuing with this example, suppose storage processors 402, 404 are connected to network 14. Network address identification process 10 may assign 306 an IP address (e.g., 10.1.0.12) to storage processor 402 and an IP address (e.g., 10.1.0.14) to storage processor 404. While an example with three computing devices being connected to the network and assigned IP addresses has been provided, it will be appreciated that any number of computing devices may be added to the network and assigned an IP address within the scope of the present disclosure.

In some embodiments, the IP address assigned to the second computing device may be unknown to the first computing device when the IP address is assigned to the second computing device. Returning to the above example, suppose storage processor 400 has been assigned IP address e.g., 10.1.0.10, storage processor 402 has been assigned IP address e.g., 10.1.0.12, and storage processor 404 has been assigned IP address e.g., 10.1.0.14. In this example, a user (e.g., user 46) of computing device 38 would like to configure storage processors 400, 402, 404. However and as discussed above, storage processors 400, 402, 404, may require another computing device to configure them for operation in a storage system (e.g., storage system 12). In this example, user 46 may need the IP address of each storage processor in order to configure them and may need some sort of identification information to determine which computing device the user is configuring. As discussed above, when IP addresses are assigned to each computing device (e.g., storage processors 400, 402, 404), the assigned IP addresses may be unknown or unexposed to other computing devices. For example, after each computing device is assigned an IP address, no other computing device may be aware of the IP address assigned to other computing devices connected to the network or the identity of the other computing devices connected to the network.

In some embodiments, network address identification process 10 may provide 300, via a first computing device connected to a network, one or more network requests to a second computing device connected to the network, wherein each of the one or more network requests include an IP address and a predefined identification indicator. For example and referring again to the example of FIG. 4, a first computing device (e.g., computing device 38) may provide 300 one or more network requests (e.g., network requests 406, 408, 410) to a second computing device (e.g., storage processors 400, 402, 404). In some embodiments, the first computing device may provide 300 the one or more network requests to a network (e.g., network 14) and the network may provide 300 the one or more network requests (e.g., network requests 406, 408, 410) to a plurality of computing devices connected to the network (e.g., storage processors 400, 402, 404). In some embodiments, the first computing device (e.g., computing device 38) may provide 300 the one or more network requests (e.g., network requests 406, 408, 410) to each computing device connected to the network. In this manner, each computing device (e.g., storage processors 400, 402, 404) may receive each of the one or more network requests (e.g., network requests 406, 408, 410).

A network request may generally include a command or request from computing device with a network address and a predefined identification indicator. A network address may generally include an IP address or other address used to designate a particular computing device connected to a network. A predefined identification indicator may include a portion of the network request that designates the network request as a request for a computing device's identification information. As will be discussed in greater detail below, a computing device may include various identification information such as, but not limited to, a serial number, a model number, vendor identification information, date of manufacture, place of manufacture, date of installation, firmware information (e.g., firmware version number), etc.

In some embodiments, the one or more network requests may include one or more HTTP requests. For example and as in known in the art, a HTTP request may generally include a packet of information that one computing device sends to another computing device to communicate or request information. In some embodiments, the one or more network requests may include a predefined identification indicator. A predefined identification indicator may include a portion of the network request that indicates that the network request is a request for identification information from another computing device. For example, suppose network request 406 is a HTTP request (e.g., "http://<10.1.0.10>/identification"). In this example, the network request may include an IP address (e.g., "10.1.0.10") and a predefined identification indicator (e.g., "identification"). The predefined identification indicator may help distinguish the request for identification information from a conventional request to access or configure a computing device. For example, suppose a user provided an HTTP request that included "http://<10.1.0.10>". In this example, storage processor 400 may provide an configuration or administration window to a user interface of the requesting computing device (e.g., computing device 38). By adding the predefined identification indicator (e.g., "identification") to the network request, storage processor 400 may provide identification information associated with the storage processor 400. While the predefined identification indicator "identification" has been described above, it will be appreciated that other predefined identification indicators may be used for requesting various kinds of information from a computing device. In some embodiments, the one or more HTTP requests may be provided by a first computing device via a web browser. For example, a user (e.g., user 46) may provide an HTTP request into a web browser (e.g., "http://<10.1.0.10>/identification") displayed on a computing device (e.g., computing device 38). Additionally and/or alternatively, network address identification process 10 may provide the HTTP request to a web browser. In some embodiments, providing 300 the one or more network requests may include providing one or more JavaScript Object Notation (JSON) requests, text files, command prompts, etc. to the second computing device.

In some embodiments, the predefined identification indicator may be specific to one or more computing device vendors. For example, one or more vendors of computing devices may define specific predefined identification indicators for their computing devices. For example, a first vendor may define a first predefined identification indicator (e.g., "identify") while a second vendor may define a second predefined identification indicator (e.g., "identification"). It will be appreciated that embodiments of present disclosure may accommodate different predefined identification indicators for different vendors. In this manner, network address identification process 10 may accommodate different network requests to identify or discover an IP address for a computing device of a particular vendor.

In some embodiments, the predefined identification indicator may be a parameter used to obtain different information from the second computing device. For example, while the above discussion has generally included specific examples to provide identification information, it will also be appreciated that various predefined identification indicators may be used as parameters to obtain different kinds of information from a computing device. For example and in some embodiments, a first predefined identification indicator may specify that e.g., a serial number of the computing device is to be provided in response to the network request while a second predefined identification indicator may specify that e.g., a model number of the computing device is to be provided in response to the network request.

In some embodiments, providing 300 the one or more network requests may include providing 310 a plurality of network requests iterating through a plurality of IP addresses. For example and in some embodiments, the one or more network requests may be sent via network address identification process 10 as part of a batch or script configured to iterate through a plurality of IP addresses. Returning to the example of FIG. 4 and in some embodiments, network address identification process 10 may provide 310 a script (e.g., user-generated and/or generated by network address identification process 10) that includes a plurality of IP addresses and is configured to automatically provide 310 the one or more network requests (e.g., network requests 406, 408, 410) by iterating through the plurality of IP addresses. As will be discussed in greater detail below, the script may be configured to filter unexpected or undesirable responses from the one or more network requests.

In some embodiments, network address identification process 10 may receive 302, from the second computing device, identification information associated with the second computing device in response to at least one network request of the one or more network requests including an IP address assigned to the second computing device. In some embodiments and referring also to the example of FIG. 5, in response to the one or more network requests (e.g., network requests 406, 408, 410), network address identification process 10 may receive 302 identification information (e.g., identification information 500, 502, 504) from one or more of the computing devices (e.g., storage processors 400, 402, 404). For example, when network request 406 is provided 300 by computing device 38 with the IP address e.g., 10.1.0.10, network address identification process 10 may receive 302, from storage processor 400, identification information 500. Additionally and/or alternatively, when network request 408 is provided 300 by computing device 38 with the IP address e.g., 10.1.0.12, network address identification process 10 may receive 302, from storage processor 404, identification information 502 and when network request 410 is provided 300 by computing device 38 with the IP address e.g., 10.1.0.14, network address identification process 10 may receive 302, from storage processor 404, identification information 504. It will be appreciated that in response to a network address including the IP address assigned to a particular computing device, the computing device may provide 300 (via network address identification process 10) identification information associated with that computing device. In some embodiments, receiving 302, from the second computing device, the identification information associated with the second computing device may include receiving a text file, a JavaScript Object Notation (JSON) response, etc. with the identification information.

In some embodiments, network address identification process 10 may provide a configuration file to configure the one or more computing devices to provide identification information in response to a network request including an IP address assigned to the computing device and the predefined identification indicator. In some embodiments and referring again to the example of FIG. 5, the one or more computing devices (e.g., computing device 38, storage processors 400, 402, 404) may include a configuration file (e.g., configuration files 506, 508, 510, 512) configured to cause the computing device to provide identification information (e.g., identification information 500, 502, 504) in response to a network request including an IP address assigned to the computing device and the predefined identification indicator. In some embodiments, the configuration file (e.g., configuration files 506, 508, 510, 512) may be provided to the computing device before or after the computing device connects to the network. For example and in some embodiments, the configuration file (e.g., configuration files 506, 508, 510, 512) may be provided by a vendor and/or provided by an administrator when a computing device connects to the network.

In some embodiments, receiving 302, from the second computing device, the identification information associated with the second computing device may include publishing 310 the identification information associated with the second computing device on a web browser displayed at the first computing device. For example and as discussed above, the one or more network requests may be provided 300 by a first computing device (e.g., computing device 38) via a web browser displayed at the computing device. In some embodiments, the identification information associated with a second computing device (e.g., storage processor 400) may be published 310 or otherwise provided by network address identification process 10 to the web browser displayed at the first computing device in response to the network request including the IP address (e.g., IP address 10.1.0.10) assigned to the second computing device (e.g., storage processor 400).

In some embodiments and as discussed above, network address identification process 10 may provide 308 a script (e.g., user-generated and/or generated by network address identification process 10) that includes a plurality of IP addresses and is configured to automatically provide 308 the one or more network requests (e.g., network requests 406, 408, 410) by iterating through the plurality of IP addresses. In some embodiments, the script may be configured to filter unexpected or undesirable responses from the one or more network requests. For example, suppose the IP address of a network request includes an IP address not assigned to any computing device. In this example, the script may filter out any error messages or other warnings received in response to a network request without an assigned IP address. In this manner, the process by which IP addresses for computing devices is determined may be more efficient by filtering out unexpected or undesired responses.

In some embodiments, network address identification process 10 may pair 304, via the first computing device, the IP address assigned to the second computing device with the identification information associated with the second computing device. Referring again to the example of FIG. 5 and in some embodiments, network address identification process 10 may receive 302 identification information (identification information 500, 502, 504) from computing devices (e.g., storage processors 400, 402, 404) in response to the one or more network requests (e.g., network requests 406, 408, 410) including the IP address assigned to each computing device. In this example and in response to receiving 302 the identification information, network address identification process 10 may pair 304, via computing device 38, identification information 500 associated with storage processor 400 and IP address e.g., 10.1.0.10 assigned to storage processor 400; identification information 502 associated with storage processor 402 and IP address e.g., 10.1.0.12 assigned to storage processor 402; and identification information 504 associated with storage processor 404 and IP address e.g., 10.1.0.14 assigned to storage processor 404. The paired identification information and IP addresses (paired identification information and IP addresses 514, 516, 518) may be stored in a file, database, or other data structure.

In some embodiments, network address identification process 10 may disable the providing of identification information in response to a network request. For example and in some embodiments, the above-described functionality may be switched off at the second computing by network address identification process 10 after the first computing device receives identification information from the second computing device. In some embodiments, network address identification process 10 may automatically disable the providing of identification information after an administrator logs in and completes some predefined initial configuration sequence on the second computing device. In some embodiments, a system administrator may switch this feature off expressly.

In some embodiments, the providing 300 of one or more network requests and receiving 302 of identification information may be implemented as a RESTful API. As is known in the art, a RESTful API may generally include an application program interface (API) that uses HTTP requests to GET, PUT, POST and DELETE data. In some embodiments, one or more network requests may include one or more HTTP requests that may be configured to request (e.g., GET) identification information in response to the HTTP request including an IP address assigned to a particular computing device and a predefined identification indicator. While the example above describes implementing aspects of network address identification process 10 as a RESTful API, it will be appreciated that various tools and APIs may be used within the scope of the present disclosure.

As discussed above, embodiments of the present disclosure may allow a user to identify an IP address assigned to and identification information associated with a computing device by simply providing one or more network requests to the computing device. In this manner, the computing devices may be connected to the same layer 3 network and the one or more network requests may include an IP address and a predefined identification indicator. If a computing device has been assigned that IP address of the network request, the computing device may provide its identification information.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
   providing, via a first computing device connected to a network, one or more network requests to a second computing device connected to the network, wherein each of the one or more network requests include, in association with a particular computing device, an IP address and a predefined identification indicator, wherein the predefined indicator includes a portion of each of the one or more network requests that designates the one or more network requests as a request for identification information associated with the particular computing device;
   receiving, from the second computing device, identification information associated with the second computing device in response to at least one network request of the one or more network requests, wherein the identification information associated with the second computing device includes an IP address assigned to the second computing device, wherein the IP address assigned to the second computing device is automatically assigned in response to connecting the second computing device to the network, wherein receiving, from the second computing device, the identification information associated with the second computing device includes publishing the identification information associated with the second computing device on a web browser displayed at the first computing device, wherein the web browser displayed at the first computing device includes a configuration window and a configuration file of the second computing device;
   pairing, via the first computing device, the IP address assigned to the second computing device with the identification information associated with the second computing device; and
   enabling, via the first computing device, a user to disable the second computing device from providing the identification information in response to the one or more network requests, wherein enabling the user to disable the second computing device from providing the identification information includes:
      allowing the user to log in to the second computing device from the first computing device,
      after the user logs in, allowing the user to complete a predefined initial configuration sequence for the second computing device, and
      in response to completing the predefined initial configuration sequence, automatically disabling the providing of identification information.

2. The computer implemented method of claim 1, further comprising:
before the second computing device is connected to the network, assigning an IP address to the second computing device.

3. The computer-implemented method of claim 1, wherein the IP address assigned to the second computing device is unknown to the first computing device when the IP address is assigned to the second computing device.

4. The computer implemented method of claim 1, wherein the one or more network requests include one or more HTTP requests.

5. The computer-implemented method of claim 1, wherein providing the one or more network requests includes providing a plurality of network requests iterating through a plurality of IP addresses.

6. The computer-implemented method of claim 1, wherein the predefined identification indicator is specific to one or more computing device vendors.

7. A computer program product residing on a non-transitory computer readable medium having a plurality of instructions stored thereon which, when executed by a processor, cause the processor to perform operations comprising:
providing, via a first computing device connected to a network, one or more network requests to a second computing device connected to the network, wherein each of the one or more network requests include, in association with a particular computing device, an IP address and a predefined identification indicator, wherein the predefined indicator includes a portion of each of the one or more network requests that designates the one or more network requests as a request for identification information associated with the particular computing device;
receiving, from the second computing device, identification information associated with the second computing device in response to at least one network request of the one or more network requests, wherein the identification information associated with the second computing device includes an IP address assigned to the second computing device, wherein the IP address assigned to the second computing device is automatically assigned in response to connecting the second computing device to the network, wherein receiving, from the second computing device, the identification information associated with the second computing device includes publishing the identification information associated with the second computing device on a web browser displayed at the first computing device, wherein the web browser displayed at the first computing device includes a configuration window and a configuration file of the second computing device;
pairing, via the first computing device, the IP address assigned to the second computing device with the identification information associated with the second computing device; and
enabling, via the first computing device, a user to disable the second computing device from providing the identification information in response to the one or more network requests, wherein enabling the user to disable the second computing device from providing the identification information includes:
allowing the user to log in to the second computing device from the first computing device, after the user logs in, allowing the user to complete a predefined initial configuration sequence for the second computing device, and
in response to completing the predefined initial configuration sequence, automatically disabling the providing of identification information.

8. The computer program product of claim 7, wherein the operations further comprise:
before the second computing device is connected to the network, assigning an IP address to the second computing device.

9. The computer program product of claim 7, wherein the IP address assigned to the second computing device is unknown to the first computing device when the IP address is assigned to the second computing device.

10. The computer program product of claim 7, wherein the one or more network_requests include one or more HTTP requests.

11. The computer program product of claim 7, wherein providing the one or more network requests includes providing a plurality of network requests iterating through a plurality of IP addresses.

12. The computer program product of claim 7, wherein the predefined identification indicator is specific to one or more computing device vendors.

13. A computing system including a processor and memory configured to perform operations comprising:
providing, via a first computing device connected to a network, one or more network requests to a second computing device connected to the network, wherein each of the one or more network requests include, in association with a particular computing device, an IP address and a predefined identification indicator, wherein the predefined indicator includes a portion of each of the one or more network requests that designates the one or more network requests as a request for identification information associated with the particular computing device;
receiving, from the second computing device, identification information associated with the second computing device in response to at least one network request of the one or more network requests, wherein the identification information associated with the second computing device includes an IP address assigned to the second computing device, wherein the IP address assigned to the second computing device is automatically assigned in response to connecting the second computing device to the network, wherein receiving, from the second computing device, the identification information associated with the second computing device includes publishing the identification information associated with the second computing device on a web browser displayed at the first computing device, wherein the web browser displayed at the first computing device includes a configuration window and a configuration file of the second computing device;
pairing, via the first computing device, the IP address assigned to the second computing device with the identification information associated with the second computing device; and
enabling, via the first computing device, a user to disable the second computing device from providing the identification information in response to the one or more network requests, wherein enabling the user to disable the second computing device from providing the identification information includes:

allowing the user to log in to the second computing device from the first computing device, after the user logs in, allowing the user to complete a predefined initial configuration sequence for the second computing device, and in response to completing the predefined initial configuration sequence, automatically disabling the providing of identification information.

14. The computing system of claim 13, wherein the processor is further configured to perform operations comprising:

before the second computing device is connected to the network, assigning an IP address to the second computing device.

15. The computing system of claim 13, wherein the IP address assigned to the second computing device is unknown to the first computing device when the IP address is assigned to the second computing device.

16. The computing system of claim 13, wherein the one or more network requests include one or more HTTP requests.

17. The computing system of claim 13, wherein providing the one or more network requests includes providing a plurality of network requests iterating through a plurality of IP addresses.

* * * * *